United States Patent [19]

Minorics

[11] Patent Number: 5,566,493
[45] Date of Patent: Oct. 22, 1996

[54] LAMP WITH RETRACTABLE UNIVERSAL BULB FOR FISHING RODS

[76] Inventor: Richard T. Minorics, 2465 N. Delaware Ave., Easton, Pa. 18042

[21] Appl. No.: 580,075

[22] Filed: Dec. 20, 1995

[51] Int. Cl.[6] ............................ A01K 87/00; A01K 87/04
[52] U.S. Cl. ................................. 43/17.5; 43/24
[58] Field of Search ....................... 43/17.5, 18.1, 43/23, 24; 362/32, 102

[56] References Cited

U.S. PATENT DOCUMENTS

| | | | |
|---|---|---|---|
| D. 305,450 | 1/1990 | Noble et al. | D22/142 |
| 3,862,509 | 1/1975 | Petersen, Jr. | 43/17.5 |
| 4,048,743 | 9/1977 | Lapinski | 43/17.5 |
| 4,117,618 | 10/1978 | Utsler | 43/17.5 |
| 4,697,375 | 10/1987 | Mills | 43/17.5 |
| 4,780,980 | 11/1988 | McCullough | 43/17.5 |
| 5,083,247 | 1/1992 | Robinson et al. | 43/17.5 |
| 5,172,508 | 12/1992 | Schmidt et al. | 43/17.5 |
| 5,182,873 | 2/1993 | Aragon, Jr. | 43/17.5 |
| 5,347,741 | 9/1994 | Konrad | 43/17.5 |

*Primary Examiner*—J. Elpel
*Attorney, Agent, or Firm*—Kenneth P. Glynn

[57] ABSTRACT

A retractable, universal lamp for a fishing pole includes a hollow handle portion and a hollow rod portion. The hollow handle portion further having an externally exposed segment. A self-contained lamp unit is positioned within the hollow handle such that a flexible, elongated connector and bulb can be universally positioned by the user for aid in night fishing. Furthermore, a plurality of light conductive eyes are disposed on an external side of the rod portion. The eyes are illuminated by light transmitted from the bulb via a bundle of optical fibers.

20 Claims, 7 Drawing Sheets

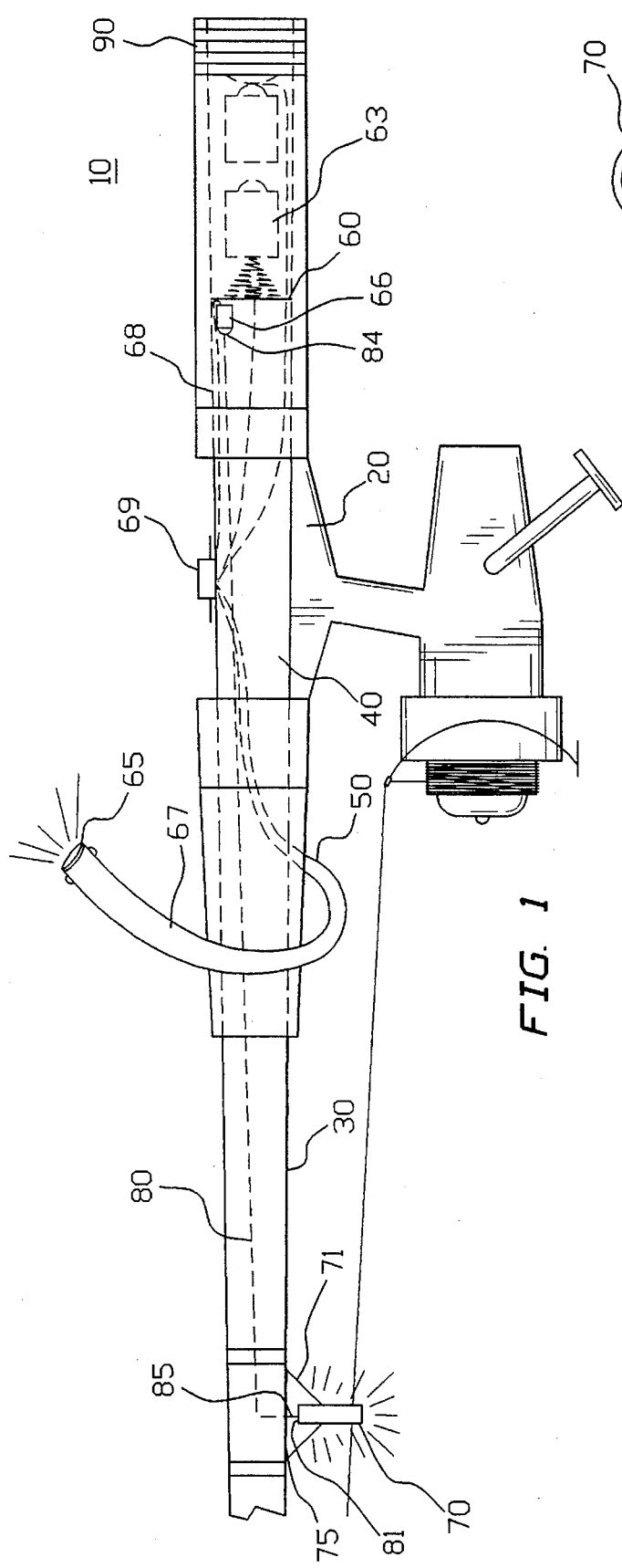
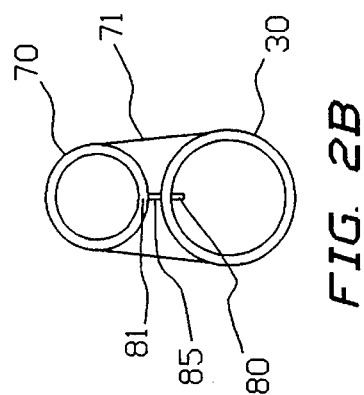
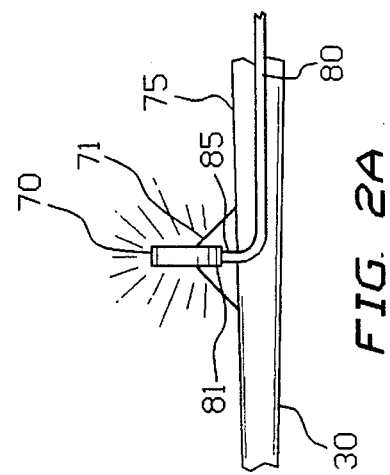

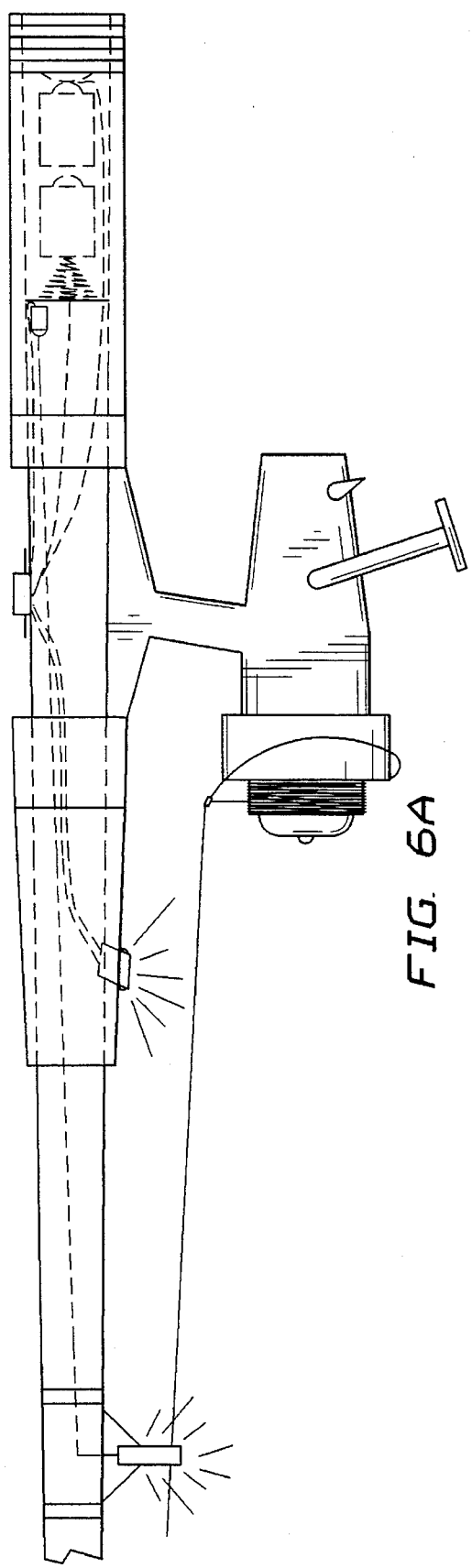

LAMP WITH RETRACTABLE UNIVERSAL BULB FOR FISHING RODS

BACKGROUND OF THE INVENTION

1. Field of the Invention

The present invention relates in general to fishing poles which have an attached or integrated source of illumination. More specifically, the present invention is directed to a lamp having a retractable, universal bulb which allows the light source to be moved in all directions with respect to the fishing rod. Furthermore, the present invention provides illuminated eye guides.

2. Information Disclosure Statement

The following patents are examples of fishing poles which have attempted to provide a means for illuminating the fishing rod.

U.S. Pat. No. 5,172,508 issued to Schmidt et al describes a lighted fishing pole which has a translucent pole with a handle attached to the end. The handle contains a self-contained light source, which when active, illuminates the interior of the pole. A switch is mounted on the self-contained light source, which extends outward through the handle to allow manual activation of the light source. The handle can be detached from the pole and used as a standard hand-held flashlight. Illumination at the tip of the fishing pole is increased by including fiber optic cables which extend from the light source to the tip of the pole.

U.S. Pat. No. 4,780,980 issued to McCullough describes a fishing rod handle having a light therein. Preferably, the fishing rod handle has an elongated cylindrical opening to slidably receive two typical dry cell batteries. A spring positioned in the opening urges the batteries toward the rearward end of the handle. An insert member, made of a rigid material, is attached to the rearward end of the fishing rod handle. The rigid member has an integral tubular portion which has an internal reduced diameter circumferential ledge. A standard bulb is employed which has an integral enlarged diameter flange. The bulb diameter flange is such that the bulb is slidably receivable within the insert integral tubular portion but larger than the internal circumferential ledge diameter. A switch is retained on the rigid insert for activating the light source. Attachment of the rigid insert to the fishing rod retains the batteries within the handle.

U.S. Pat. No. 1,836,034 issued to Luchansky describes a light adapted to serve as a handle and/or can be formed integrally within a handle of an umbrella or fishing rod.

U.S. Pat. No. 4,048,743 describes a hand caster for fishing. The hand caster has a rotatable, frictional tensioned casting head and a light emitting means with at least one battery disposed in the tubular handle of the device itself. The hand caster has a casting head which provides a working interconnection between the hand caster and a light emitting means, such that the light will act as a handle for the caster. The hand caster includes a tubular handle extending axially of, and away from, the abutment side of the casting head, containing the aforementioned batteries and light emitting means. The hand caster can also be connected to corresponding casters of larger or smaller sizes.

U.S. Design Pat. No. 305,450 issued to Noble et al. shows a combined fishing pole, night light and bite indicator light.

U.S. Pat. No. 3,862,509 issued to Peterson, Jr., describes a eyeless fishing pole. A device is described wherein the fish line is guided down the center of a hollow, telescoping fishing pole. The fishing pole is made of a transparent or translucent plastic material.

This allows a flashlight mounted within the handle of the fishing pole to illuminate the fishing pole and thereby provide light for night fishing. The flashlight is reversible so that it can provide illumination within the pole or shine outside. The fishing pole, as mentioned above, is constructed such that the sections are adapted to nest together and be stored in the hollow end of the fishing pole.

Notwithstanding the above prior art, it is believed that the device and method set forth herein is neither taught nor rendered obvious.

SUMMARY AND OBJECTS OF THE INVENTION

The present invention involves providing a lamp with a retractable, universal bulb on a fishing pole. This invention provides sufficient light with which to fish at times when the light is low or diminished. However, the light does not illuminate the area such that it has a detrimental effect on the fishing itself. In addition, this invention provides an illumination mechanism which allows the fisherman to shine light in any direction but maintain a hands free situation. Even furthermore, the present invention provides a lighting means for guiding fishing line onto the fishing pole and also for observing the movement of the fishing pole if a fish is striking. Present illuminated fishing pole technology limits the direction that the light can be shined and in most cases, only provides light to illuminate the handle or the pole and were obviously not designed to provide directed lighting. Furthermore, by illuminating the pole itself, too much light is provided which scares away the fish.

The present invention accomplishes the above functionality and corrects the defects of past devices by providing a fishing pole with a self-contained lamp unit which is both retractable and is universally directable with respect to the fishing pole. One of the advantages of the retractable bulb is that it may be turned on while still inside the handle, thereby providing a low level of illumination but not enough to scare the fish away. In addition, the bulb can be positioned in any direction, thereby providing a spotlight effect when necessary. Furthermore, the fishing pole is provided with illuminated eyes which will provide sufficient light to fish by, but not enough to distract the fish. The fishing pole has a handle which has a hollow center for receiving the self-contained lamp unit. The self-contained lamp unit has an elongated, flexible neck which allows the user to direct the light in any desired direction. A portion of the hollowed handle is exposed to the outside to allow the elongated, flexible neck of the lamp unit to be positioned in any desired direction.

As stated above, the fishing pole has a set of eyes disposed on the length of the pole. These eyes are constructed from a translucent or transparent material. A bundle of fiber optic cables are provided within the pole and extended to each of the eyes, thereby providing illumination when the light source is activated.

BRIEF DESCRIPTION OF THE DRAWINGS

The present invention should be more fully understood when the specification herein is taken in conjunction with the drawings appended thereto, wherein:

FIG. 1 shows a side view of an embodiment of the present invention;

FIG. 2a shows an enlarged side perspective view of the optic fiber and eye arrangement;

FIG. 2b shows a cross-sectional view of the optic fiber and eye arrangement;

FIGS. 6a, 6b, and 6c show potential positions of the universal, retractable bulb.

DETAILED DESCRIPTION OF THE PRESENT INVENTION

Figure 3:
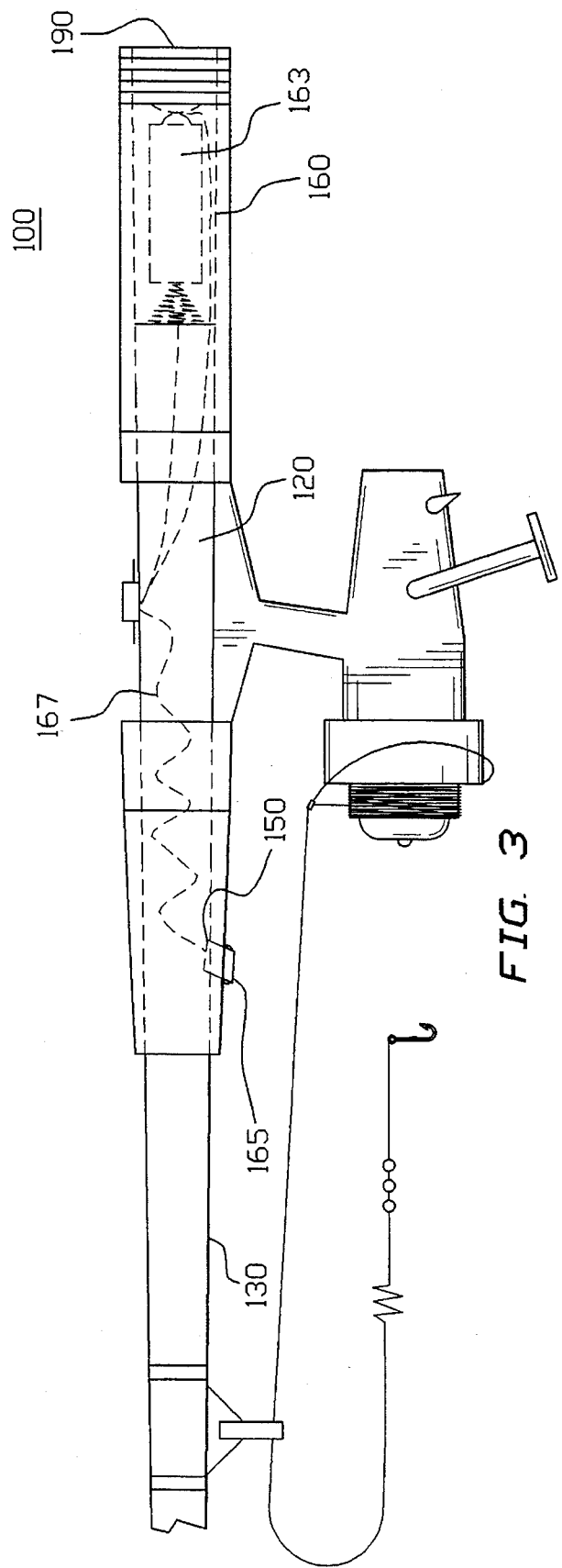
FIG. 3 shows an alternative embodiment of the present invention.

The present invention is a fishing pole which enhances a fisherman's ability to fish at night. This is accomplished by providing two sources of light which help in attaching bait, guiding line and seeing strikes but does not deter fish from approaching the lure. One source of light is situated in the handle of the fishing pole. This source has a flexible, elongated connector which allows the bulb to be positioned in any direction and remain there hands-free. The connector can be made from any flexible material and preferably one that can retain its position. This feature allows the fisherman to position the bulb at the point of interest and still use both hands to bait the hook and to perform other fishing related functions. In addition, this source can remain within the handle to provide a low level illumination without having a detrimental effect on the fishing. The other source of illumination involves the eye pieces situated on the fishing pole which are used for guiding fish line. A bundle of fiber optic cables transmit light from a light source to the eyes, which in turn illuminate a small area around the eyes so as to better observe if fish are striking and for guiding fish line. The eyes are constructed from light conductive materials, such as clear plastic.

Referring to FIG. 1, the present invention involves a lamp having a retractable, universal bulb for a fishing pole which enhances a fisherman's ability to fish at night. A preferred embodiment of the fishing pole having a lamp unit with a retractable, universal bulb is depicted generally as 10.

Fishing pole 10 has a handle portion 20 and a rod portion 30. Handle portion 20 and rod portion 30 can be a single construct or be two interconnectable pieces. Handle portion 20 has a hollow section 40 and an externally exposed segment 50. A self-contained lamp unit 60 can be placed within hollow section 40 to provide two sources of illumination. Self-contained lamp unit 60 has a bulb 65 which is electrically connected to an electrical source 63 via a connector 67. Lamp unit 60 has a switch 69 which supplies electrical current from electrical source 63 to bulb 65 when in an on position and no current when in an off position. Switch 69 is situated on handle portion 20 such that it is easily turned on and off by the user. Lamp unit 60 may also have a distress signalling mode, i.e. a flashing mode. In this embodiment switch 69 would have an on position, off position and a flashing position.

Electrical source 63 can be one of any conventional, commercial sources and is preferably a battery similar to the pencil light type batteries. Bulb 65 can also be one of a variety of commercially available types and can be a buglight type. These bulbs, when activated, deter bugs and other insects from approaching the light source. This will provide better comfort when fishing at night. Connector 67 is made from a flexible material which is elongatable and positionable with respect to fishing pole 10. The external body of connector 67 is preferably made from a material which is flexible yet rigid enough to maintain its direction when positioned.

Figure 6B:
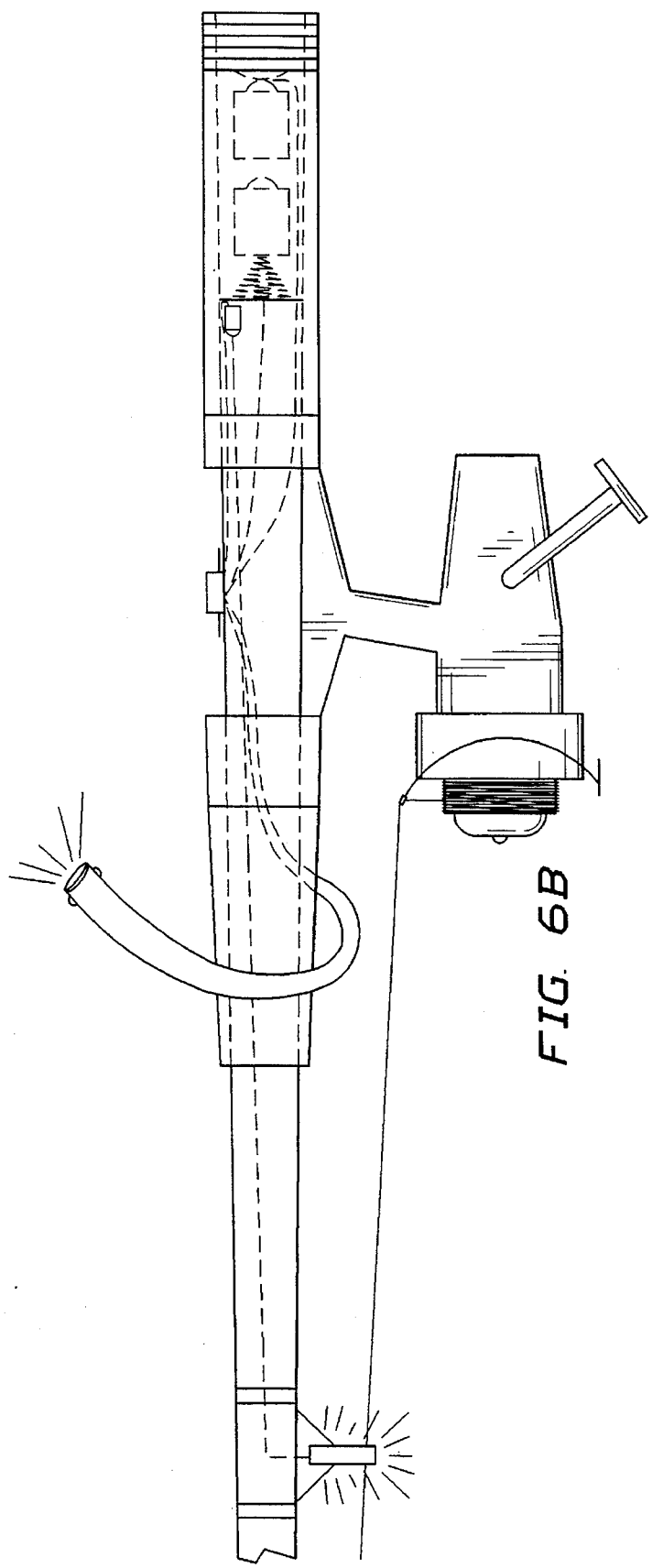
Figure 6C:
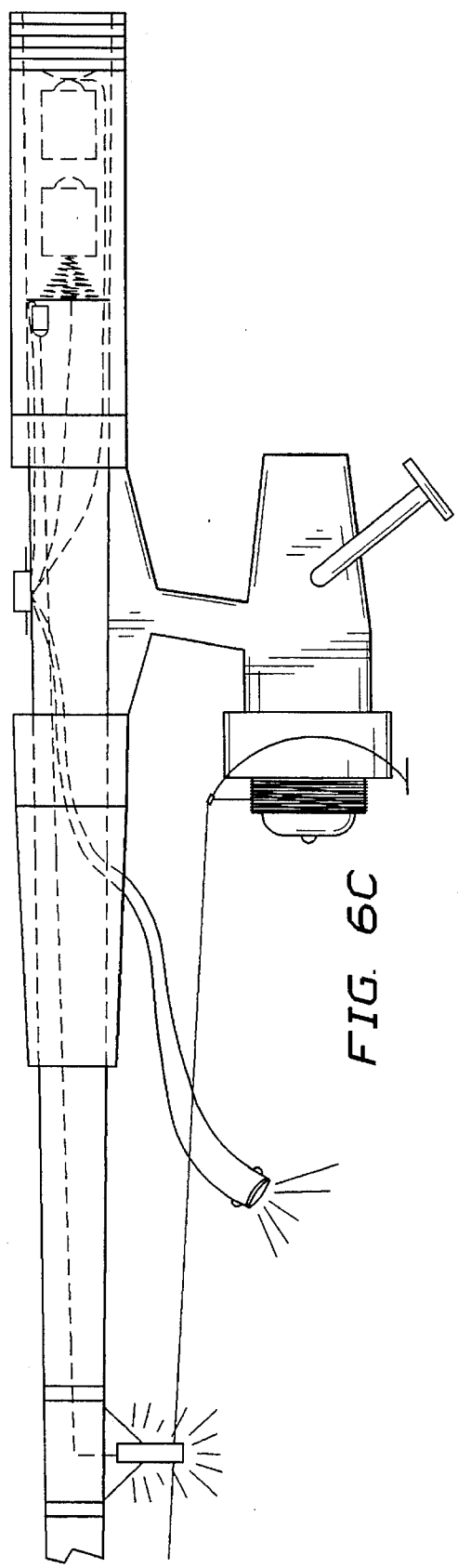

Placement of lamp unit 60 within hollow section 40 is such that bulb 65 and connector 67 can be lifted out of hollow section 40 via an externally exposed segment 50 and positioned in any direction relative to fishing pole 10. Referring now also to FIGS. 6a, 6b and 6c, this will allow an user to either 1) turn the light on when it is in its retracted position within the handle portion 20 and provide low level illumination or 2) lift bulb 65 and connector 67 and position it such that it points to the area of interest to the user. Once positioned it is assumed that bulb 65 and connector 67 will retain the position in a hands free environment, allowing the user to perform other fishing-related activities. The second source of illumination involves eyes 70 which are used for guiding fish line. Eyes 70 are situated slightly above an external side 75 of rod portion 30. Referring now also to FIG. 2a and 2b, eyes 70 are affixed slightly above external side 75 of rod portion 30 with eye supports 71. Eyes 70 can be made from any light conductive materials such as clear plastic.

Referring back to FIG. 1, a bundle of fiber optic cables 80 have a first end 84 abutting a second bulb 66 and a second end 85 abutting a near side 81 of each of eyes 70. An opening in rod portion 30 in line with each near side 81 of eyes 70 allows fiber optic cables 80 to abut each near side 81 of eyes 70. Second bulb 66 is electrically connected to electrical source 63 with connector 68, and provides illumination when switch 69 is in an on position. Fiber optic cables 80 can be one of any commercial varieties and can be of the self-generating type. This type continues illumination for a period of time after the light source is deactivated. Eyes 70 are initially illuminated via fiber optic cables 80 when switch 69 is in an on position. This source of light will enable the user to observe fish strikes at night.

Lamp unit 60 can be placed within hollow section 40 by a variety of means. One means for placement and retention of lamp unit 60 is to have an endcap 90 at the end of handle portion 20 which is not connected to rod portion 30. Endcap 90 is removable and allows for placement of lamp unit 60. Lamp unit 60 and handle portion 20 are constructed such that lamp unit 60 fits snugly within hollow section 40 and has no undue movement.

Referring to FIG. 3, another embodiment of the fishing pole is depicted and is generally indicated as 100. In this embodiment fishing pole 100 has a hollow portion 120 and a rod portion 130. Similar to the first embodiment, it can be made from 1 or 2 pieces. Handle portion 120 includes a hollow section and an externally exposed segment 150. A self-contained lamp unit 160 has an electrical source 163 connected to a bulb 165 via a connector 167. The characteristics of the individual components are the same as in embodiment one. As before lamp unit 160 is positioned such that an user can position bulb 165 and connector 167 in any desired position. An endcap 190 is situated at the end of handle portion 120, as before, to provide a means for placing lamp unit 160. Similar to FIG. 1, a switch is situated on handle portion 120 for easy manipulation.

Figure 4:
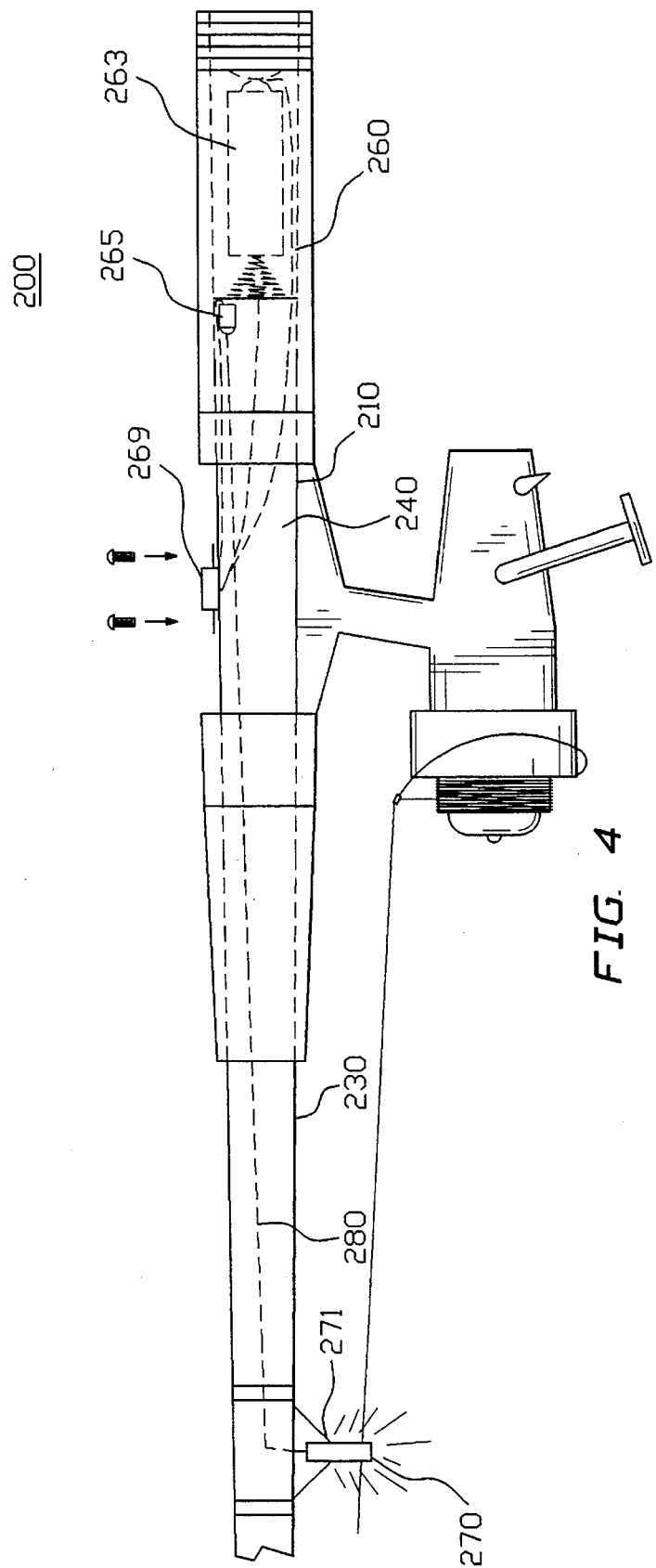
FIG. 4 shows still another embodiment of the present invention.

Referring to FIG. 4, a third embodiment of the present invention is shown. A fishing pole 200 has a handle portion 210 and a rod portion 230. Handle portion 210 has a hollow section 240 for placement of self-contained lamp unit 260. Lamp unit 260 has a bulb 265 electrically connected to an electrical source 263. A switch 269 situated on handle portion 210 for easy access, provides current to bulb 265 from electrical source 263 when switch 269 is in an on position and provides no electrical source when in an off position. Rod portion 230 has a set of eyes 270 situated slightly above rod portion 230 and held in position by eye supports 271 to an external side of rod portion 230. A bundle of fiber optic cables 280 transmit light to eyes 270 which in turn illuminate the areas around eyes 270. This enable the user to fish strikes at night.

Figure 5:
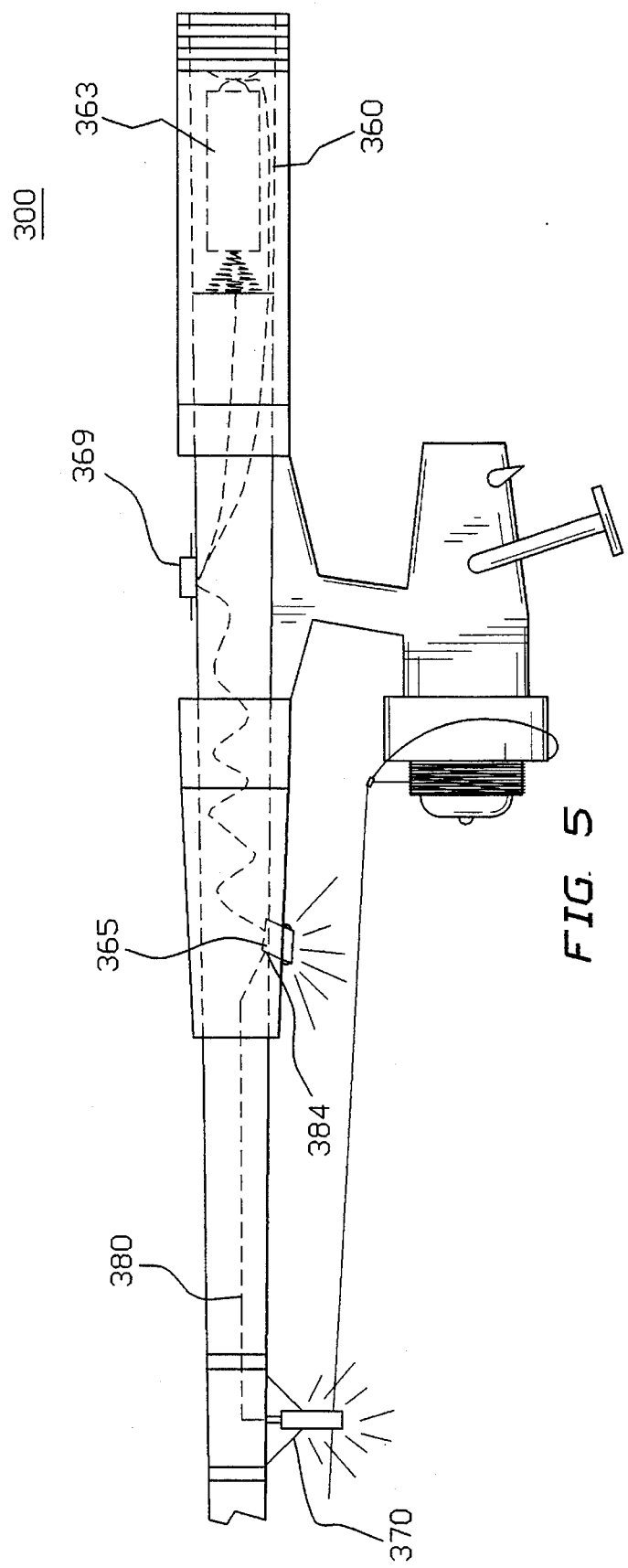
FIG. 5 shows a further embodiment of the present invention.

Referring to FIG. 5, a fourth embodiment of the present invention is shown. A fishing pole 300 is illustrated, being similar in function to embodiment one. However, the method for providing a light source to a set of eyes 370 is different. In this embodiment, a self-contained lamp unit 360 has a single bulb 365 which acts as a source of light for the universally positionable feature and as a light source for eyes 370. Instead of abutting a first end 384 of fiber optic cables 380 to a second bulb it is abutted against bulb 365. When a switch 369 is activated, a electrical source 363 provides electrical current to bulb 365, which in turn provides light to both the postionable light feature and acts as a light source for fiber optic cables 380. This light is then transmitted to eyes 370, which in turn illuminate the area around eyes 370.

Obviously, numerous modifications and variations of the present invention are possible in light of the above teachings. It is therefore understood that within the scope of the appended claims, the invention may be practiced otherwise than as specifically described herein.

What is claimed is:

1. A fishing pole comprising:

a) a handle portion and a rod portion at an end of said handle portion;

b) said handle portion having a hollow section and said hollow section further having an externally exposed segment;

c) a self-contained lamp unit having an electrical source, a bulb electrically connected to said electrical source via a flexible, elongated means for connecting and a means for switching from a first position, which supplies electrical current from said electrical source to said bulb, to a second position which supplies no electrical current;

d) said handle portion having a means for placing and retaining said self-contained lamp unit within said hollow section of said handle portion and for having access to said means for switching; and e) said means for placing and retaining positioning said flexible, elongated connecting means of said self-contained lamp unit such that it is aligned with said externally exposed segment, wherein said position of said flexible, elongated connecting means allows for universal positioning of said bulb in any desired direction.

2. A fishing pole as in claim 1, wherein said means for connecting is constructed from a material which allows for great flexibility in positioning of said bulb, but rigid enough to retain the desired position.

3. A fishing pole as in claim 1, wherein said electrical source is at least one battery.

4. A fishing pole as in claim 1, wherein said bulb is a bug light bulb which deters insects and bugs away from said bulb when said switching means is in the first position.

5. A fishing pole as in claim 1, wherein said means for placing and retaining said self-contained lamp unit further includes:

a) a removable end cap at another end of said handle portion; and b) a means for attaching and detaching said removable end cap to allow placement of said self-contained lamp unit in said handle portion.

6. A fishing pole as claimed in claim 1, wherein said means for switching further includes a flashing position to signal distress.

7. A fishing pole comprising:

a) a hollow handle portion and a hollow rod portion at an end of said hollow handle portion;

b) a self-contained lamp unit having an electrical source, a bulb electrically connected to said electrical source via a means for connecting and a means for switching from a first position which supplies electrical current from said electrical source to said bulb, to a second position which supplies no electrical current;

c) said hollow handle portion having a means for placing and retaining said self-contained lamp unit within an interior of said hollow handle portion and for having access to said means for switching;

d) a plurality of eyes disposed on an external side of said rod portion, said eyes being constructed of a light conductive material; and e) a plurality of optical fibers having a first end and a second end, said first end abutting said bulb and said second end abutting an end of each of said eyes closest to said external side of said rod portion, said rod portion having an opening for each of said eyes to allow one of said plurality of optical fibers to abut each of said plurality of eyes, wherein said plurality of optical fibers will transmit light to each of said plurality of eyes and effecting illumination of same, when said means for switching is in a first position.

8. A fishing pole as in claim 7, wherein said plurality of optical fibers are self-generating optical fibers.

9. A fishing pole as in claim 7, wherein said electrical source is at least one battery.

10. A fishing pole as in claim 7, wherein said bulb is a bug light bulb which deters insects and bugs away from said bulb when said switching means is in the first position.

11. A fishing pole as in claim 7, wherein said means for placing and retaining said self-contained lamp unit further includes:

a) a removable end cap at another end of said handle portion; and b) a means for attaching and detaching said removable end cap to allow placement of said self-contained lamp unit in said handle portion.

12. A fishing pole as in claim 7, wherein said plurality of eyes comprise clear plastic material.

13. A fishing pole comprising:

a) a hollow handle portion and a hollow rod portion at an end of said hollow portion;

b) said hollow handle portion having an externally exposed segment;

c) said self-contained lamp unit having an electrical source, at least one bulb electrically connected to said electrical source via a flexible, elongated means for connecting and a means for switching from a first position which supplies electrical current from said electrical source to said at least one bulb, to a second position which supplies no electrical current;

d) said hollow handle portion having a means for placing and retaining said self-contained lamp unit within an interior of said hollow handle portion;

e) said means for placing and retaining positioning said flexible, elongated connection means such that it is aligned with said externally exposed segment, wherein said position of said flexible, elongated connection means allows for universal positioning of said at least one bulb in any desired direction;

f) a plurality of eyes disposed on an external side of said rod portion, said eyes being constructed of a light conductive material; and g) a plurality of optical fibers having a first end and a second end, said first end abutting said at least one bulb and said second end abutting an end of said eyes closest to said external side of said rod portion, said rod portion having an opening for each of said plurality of eyes to allow one of said plurality of optical fibers to abut each of said plurality of eyes, wherein said plurality of optical fibers will transmit light to each of said plurality of eyes and effecting illumination of same, when said means for switching is in a first position.

14. A fishing pole as in claim 13, wherein said means for connecting is constructed from a material which allows for great flexibility in positioning of said bulb, but rigid enough to retain the desired position.

15. A fishing pole as in claim 13, wherein said electrical source is at least one battery.

16. A fishing pole as in claim 13, wherein said bulb is a bug light bulb variety which deters insects and bugs away from said bulb when said switching means is in the first position.

17. A fishing pole as in claim 13, wherein said means for placing and retaining said self-contained lamp unit further includes:

a) a removable end cap at another end of said handle portion; and b) a means for attaching and detaching said removable end cap to allow placement of said self-contained lamp unit in said handle portion.

18. A fishing pole as in claim 13, wherein said plurality of optical fibers are of the self-generating optical fibers.

19. A fishing pole as in claim 13, wherein said plurality of eyes comprise clear plastic material.

20. A fishing pole as claimed in claim 13, wherein said means for switching further includes a flashing position to signal distress.

* * * * *